United States Patent

Alstad et al.

[15] 3,665,431

[45] May 23, 1972

[54] MAGNETO-OPTIC TRANSDUCER

[72] Inventors: John K. Alstad; John D. Armitage, Jr.; Geoffrey Bate, all of Boulder, Colo.

[73] Assignee: International Business Machines Corporation, Armonk, N.Y.

[22] Filed: June 25, 1970

[21] Appl. No.: 49,758

[52] U.S. Cl. ..........................340/174.1MO, 179/100.2 CH

[51] Int. Cl. ..........................G11b 5/30

[58] Field of Search.179/100.2 CH; 340/174 YC, 174.1 MO; 350/151

[56] References Cited

UNITED STATES PATENTS

| | | | |
|---|---|---|---|
| 3,474,431 | 10/1969 | Griffiths | 340/174.1 MO |
| 3,465,322 | 9/1969 | Stapper | 340/174.1 MO |
| 3,513,457 | 5/1970 | Nelson | 340/174.1 MO |
| 3,229,273 | 1/1966 | Baaba et al. | 340/174.1 MO |
| 3,474,428 | 10/1969 | Nelson et al. | 340/174.1 MO |

*Primary Examiner*—Bernard Konick
*Assistant Examiner*—J. Russell Goudeau
*Attorney*—Hanifin & Jancin and Homer L. Knearl

[57] ABSTRACT

Disclosed herein is a new magneto-optic transducer which orients the transfer film non-parallel to the record storage medium with only an edge of the transfer film adjacent the record storage medium. The magneto-optic transducer also provides a reflecting surface adjacent the surface of the record storage medium on either side of the transfer film so that the magneto-optic Kerr or Faraday Effect may be utilized with the transducer. Furthermore, the reflecting surface permits a focused light beam to be directed near the edge of the transfer film adjacent the storage medium.

9 Claims, 5 Drawing Figures

INVENTORS
JOHN K. ALSTAD
JOHN D. ARMITAGE
GEOFFREY BATE

BY Homer L. Knearl
ATTORNEY

MAGNETO-OPTIC TRANSDUCER

BACKGROUND OF THE INVENTION

1. Field of the Invention

This invention relates to reading out magnetically recorded information from the surface of a magnetic storage medium. More particularly, the invention relates to a magneto-optic transducer of a particular new configuration which can utilize either the magneto-optic Kerr Effect or the magneto-optic Faraday Effect. The two effects are, in fact, one phenomenon, but each has historically been identified by the name of its discoverer. The Kerr Effect is the magneto-optic effect observed when light is reflected from a magnetized magneto-optic material, and the Faraday Effect is the effect observed when light is passed through a magnetized magneto-optic thin film.

As described herein, the magneto-optic transducer is used to read out information from magnetic tape. However, the same transducer could be used to read information from any magnetic thin film, or from a magnetic disk or drum.

2. Description of the Prior Art

An example of the state of the technology up to the point of this invention is taught in the A.M. Nelson et al., U.S. Pat. No. 3,474,428. The magneto-optic transducer taught in the Nelson patent is shown in FIG. 1 herein. The magneto-optic transducer consists of a prism 10 having a magnetic thin film 12 coated on the bottom face thereof. As magnetic tape 14 moves under the prism 10, magnetization in the tape transfers to the film 12.

The magnetization of the film 12 is read out by reflecting linearly polarized light off the thin film 12. The light produced by the light source 16 is linearly polarized by a polarizer 18. After the light reflects off of thin film 12, it passes through analyzer 20 and is detected by photodetector 22.

Light reflected off of thin film 12 has its plane of polarization rotated depending upon the strength and direction of magnetization of the thin film 12 and, also, depending upon the magneto-optic properties of thin film 12. This rotation is detected by analyzer 20 whose polarization axis is set up to pass more light intensity for reflected light rotated in one direction and less light intensity for reflected light rotated in any other direction. Thus, the change in intensity of light detected by the photodetector 22 indicates whether the magnetization of the thin film 12 is in one direction or another.

In FIGS. 2A and B the effects known as longitudinal Kerr Effect and transverse Kerr Effect are diagrammed. These are of interest in understanding the types of phenomena which can be used in a magneto-optic transducer to read out magnetization information.

First, longitudinal Kerr Effect occurs where the magnetization direction is in the same plane as the plane formed by the incident and reflected light. In FIG. 2A, the magnetization is identified by the bold arrow positioned in the thin film 12, while the incident and reflected rays of light are shown in dashed lines. Longitudinal Kerr Effect is usually detected with the analyzer 20 and photodetector 22 as just described in FIG. 1. In other words, longitudinal Kerr Effect is generally defined as a rotation of the plane of polarization of reflected light relative to the incident light.

The transverse Kerr Effect, on the other hand, occurs where the direction of magnetization in the magnetic thin film is transverse or perpendicular to the plane formed by the incident and reflected light. In FIG. 2B, the magnetization is identified by the bold arrow positioned in the thin film 12 while the incident and reflected rays of light are shown in dashed lines. Detection of the transverse Kerr Effect is slightly different than that of the longitudinal Kerr Effect in that analyzer 20 is optional. In the transverse Kerr Effect, both the rotation and the intensity of the reflected light vary with the direction of magnetization in the tape 14. Thus, the physical characteristics observed in the transverse Kerr Effect can be changes in rotation of the plane of polarization or changes in reflected light intensity.

The above effects have been described to provide background information for the explanation of the invention. Both the longitudinal Kerr Effect and the transverse Kerr Effect may be used in this invention. In addition, as will be pointed out shortly, the Faraday Effect in both a longitudinal and a transverse mode (just as described above for the Kerr Effect) may be utilized by the invention herein.

The problem with the prior art device shown in FIG. 1 is largely that the thin film 12 suffers greatly from wear because of contact with a moving magnetic storage medium, such as the tape 14. The thin film 12 is likely to be on the order of only a few hundred Angstrom units thick. Due to the abrasive nature of magnetic tape, this thin film can be, effectively, sanded or worn away in a very short period of time. Thus, there is a critical problem in positioning the tape 14 close to the thin film 12 to obtain good magneto-optic transducing action, while at the same time, there is a desire to space the tape 14 away from the thin film 12 to increase the life of the thin film 12.

Another problem with the prior art magneto-optic transducer, is that its resolution is limited by the size of the light beam reflected off of the thin film. A light beam having a cross-section measured in the order of microinches is the smallest beam possible. Accordingly, the smallest dimension of magnetization that can be resolved is in the order of 100 microinches.

A basic invention in magneto optics which solves the first of the above-mentioned problems is taught in U.S. Pat. No. 3,465,322, the invention being conceived by Mr. C. H. Stapper, Jr., and commonly assigned with this invention. The Stapper patent teaches a magneto-optic transfer film non-parallel to the record storage medium with only one edge of the transfer film adjacent the record storage medium. The film is supported in place on a glass plate. In this way, the Stapper patent avoids the wear problem of the prior art transducer shown in FIG. 1. However, since the Stapper invention, the development of the technology has lead to discoveries whereby an optimized magneto-optic transducer can be created with a vertical thin film, the problems related to optimizing such a vertical thin film transducer are (1) increasing the signal by bringing a greater intensity of light to bear; (2) improving the optics of the transducer so as to reduce the amount of light lost during the transducing operation; (3) enhancing the transfer of magnetization from the storage medium to the vertical thin film; and (4) enhancing the magneto-optic interaction between the light and the vertical thin film.

It is an object of this invention to magneto-optically transduce magnetization information with a magneto-optic transducer resistant to wear.

It is another object of this invention to magneto-optically transduce magnetization information with a light beam focussed to provide high intensity light at a spot on a non-parallel transfer film whereby the transfer film enables extremely high resolution in the detection of magnetization in the storage medium down to and in the order of 100 Angstrom units.

It is another object of this invention to enhance performance of the magneto-optic transducer by optimizing the optics of the light passed to and from the thin film and by optimizing the magneto-optic interaction at the thin film.

It is another object of this invention to enhance the magneto-optic transducing of information by enhancing the transfer of magnetization from the storage medium to a transfer film non-parallel to the storage medium.

SUMMARY OF THE INVENTION

In accordance with the above objects, the invention is accomplished by a magneto-optic transducer made up of a thin magneto-optic transfer film in a plane non-parallel to the surface of the magnetic storage medium being read out with one edge of the transfer film immediately adjacent that surface. The film temporarily stores the magnetic field produced by magnetization in the storage medium. Therefore, variations in magnetization in the medium will be duplicated by variations in the magnetic field temporarily stored in the film as the medium moves past the edge of the film.

The optics of the transducer are optimized by providing a light transparent member on one or both sides of the thin transfer film. The light beam should have an angle of incidence with the thin film which is somewhere between 30° to 60°. Of course, other angles of incidence will still give a magneto-optic effect, but the optimum effect will be obtained in this range.

The light transparent member should be shaped so that the light path of the entering light beam is nearly perpendicular to the surface of one face of the member. In this way, almost all of the light will enter the light transparent member and very little will be reflected back from the surface of the member. In addition the surface of the light transparent member which is adjacent the magnetic storage medium should provide a reflective inner face. After the magneto-optic inneraction (Kerr or Faraday) the light beam emanating from the film (either by reflection from or refraction through the film) will be internally reflected back to a face of the transparent member nearly normal to the light path.

As an additional feature of the invention, the magneto-optic transducer may have a curved surface adjacent the magnetic storage medium to be read out. This is particularly useful in reading magnetic tape as the tape can be brought into close contact with the transducer.

As another feature of the invention, the magneto-optic Kerr Effect can be used alone and only one light transmissive member on one side of the transfer film is required.

As yet another feature of the invention, an additional bias magnetic field could be provided to aid the transfer of magnetization from the storage medium to the thin transfer film.

As another feature of the invention, the transfer film instead of being a single layer could be multiple alternate layers of ferromagnetic material and dielectric material.

As another feature of the invention the bottom face of the transducer adjacent the storage medium can be coated with a thin metal film to enhance reflection at that face and, also, to further enhance resistance of the transducer to wear.

Also, as another feature of the invention, the bottom face of the transducer can be grooved with slots along the direction of motion of the storage medium to permit the air film between the transducer and the storage medium to escape and thus achieve even closer positioning of the transducer with the film.

There are many advantages to our invention. Some of these are elimination of the wear problem, the ability to bring a moving magnetic storage medium in closer proximity to a magneto-optic transducer without worrying about the wear problem and finally, increased resolution down-to-and-in-the order of 100 Angstrom units. A resolution never heretofore obtained in any transducer.

First, as to the wear problem in our invention, the thin film is positioned between two light transmission members which are resistant to wear caused by contact with moving magnetic tape or disk. Thus, the useful life of the magneto-optic transducer is much greater than any other previous magneto-optic transducer.

With regard to resolution, the thickness of the vertical magnetic thin film is about 200 Angstrom units. This dimension of the film is positioned transverse to the movement of the magnetic storage medium so that, effectively, the resolution of the transducer as the magnetic storage medium moves under it, is 200 Angstrom units. This is an increase in resolution of two orders of magnitude over the conventional wire-wound magnetic head transducer. It is also an increase in resolution over the prior art magneto-optic transducers, in that those transducers are limited in resolution to the cross-section dimension of the light beam they use (in the order of 100 microinches; 1 microinch = 254 A.).

The foregoing and other objects, features, and advantages of the invention will be apparent from the following more particular description of preferred embodiments of the invention, as illustrated in the accompanying drawings.

DESCRIPTION OF THE PREFERRED EMBODIMENTS

Figure 3:
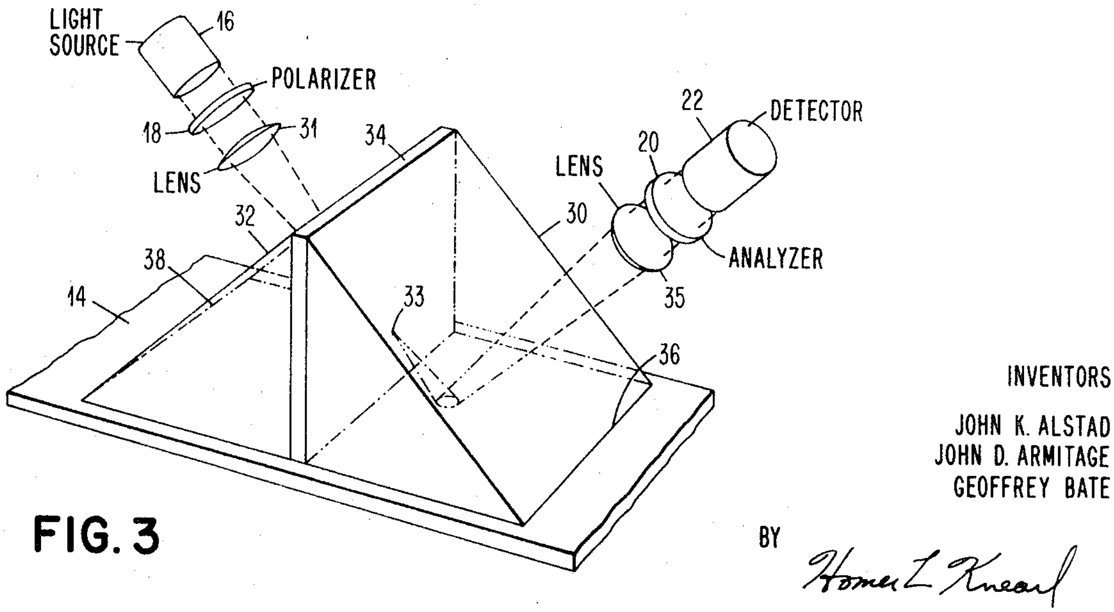
FIG. 3 shows one preferred embodiment of the inventive magneto-optic transducer utilizing two right-angle prisms with a vertical magnetic thin film sandwiched between the two prisms.

In FIG. 3 the invention is implemented by placing a vertical thin magnetic film between two right-angle prisms. The prisms are made from glass. They are cut so that the face on the hypotenuse of the right triangle will be nearly normal to the light path as light enters and leaves the transducer. In this way, the amount of light entering and leaving the transducer is optimized with little or no reflection at that face of the transducer.

The magnetic thin film 34 bonded to the prisms 30 and 32 can be of any of the magneto-optic thin film materials well known in the art. The thickness of the film 34 is preferably between 200 and 500 Angstrom units.

The edge of the film adjacent tape 14 should be contiguous with the bottom of the prisms which form the bottom of the transducer. The magnetization will only transfer a short distance from the tape 14 up the film 34. For small areas of magnetization the depth of magnetic transfer up the film 34 is approximately equal to the length of the magnetization domain in the tape 14. For example, for high density binary recording, this depth may only be 50–100 microinches. Therefore, the edge of the thin film 34 should be contiguous with the bottom of the prisms.

To achieve high light intensity, lens 31 focesses the light onto the thin film 14 near its edge. Lens 31 collects linearly polarized light supplied by light source 16 and polarizer 18. Light as used herein is not limited to the visible spectrum, but includes all radiant energy behaving in a manner similar to the visible spectrum. The light is shaped by lens 31 into a conical beam that is focussed to point 33 on the thin film 34. At point 33, some of the light is reflected from the film and some of the light is transmitted through the film. Light transmitted through the film reflects off the bottom of prism 30 and is collected by lens 35 to be directed through analyzer 20 to photodetector 22. Light reflected off of film 34 is reflected off of the bottom of prism 32 and could be collected and detected by a lens, analyzer and photodetector also.

The transducer is mounted with brackets (not shown) so that the tape 14 may be moved past the bottom of the transducer. Tape 14 can be placed in contact with, or in close proximity to, the bottom of the transducer, either by pressure pad or by tension in the tape. Of course, it may be desirable to shape the edges 36 and 38 of the transducer to optimize the contact between the tape 14 and the transducer.

Figure 4:
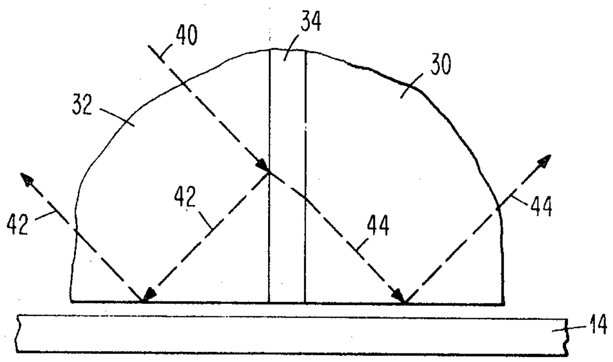
FIG. 4 shows the path of incident, reflected, and transmitted light from and through the magnetic transfer film near the surface of the moving magnetic storage medium.

The operation of the transducer can be more clearly seen in FIG. 4 where there is an enlarged view of the tape relative to the vertical thin film.

The incident, linearly polarized light 40 strikes the thin film 34. Part of the light is then reflected internally in the prism 32 and the remainder of the light is refracted through the film 34 and into prism 30.

The reflected light 42 will have its plane of polarization rotated in accordance with the Kerr Effect. The refracted light 44 will have its plane of polarization rotated in accordance with the Faraday Effect. The reflected light 42 then reflects off the bottom of prism 32 and exits out the hypotenuse face of the right-angle prism 32. Similarly, the refracted light 44 reflects off the bottom of prism 30 and exits out the hypotenuse face of right-angle prism 30.

If the longitudinal Kerr Effect is being observed, then an analyzer 20 and a photodetector 22 may be used to detect the rotation of the plane of polarization of either the reflected light exiting from prism 32 or the refracted light exiting from prism 30. Of course, if desired, both the reflected light 42 and the refracted light 44 could be simultaneously monitored by two sets of analyzers and photodetectors. Also, if the transverse Kerr Effect or the transverse Faraday Effect is being monitored, then only a photodetector is necessary to detect the change in intensity of the reflected light 42 or the refracted light 44.

As a practical matter, when the light is focussed down to a spot, the light rays are not exactly parallel. Therefore, for either direction of magnetization (longitudinal or transverse), there will be both a longitudinal and transverse magneto-optic component in the total magneto-optic effect.

Figure 5A:
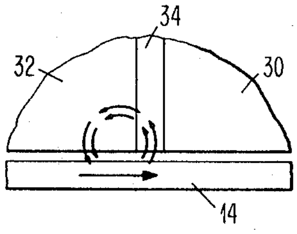
FIGS. 5A, 5B, and 5C show the field in the vertical magnetic transfer film as a magnetized area in the moving magnetic storage medium moves under the transducer.
Figure 5B:
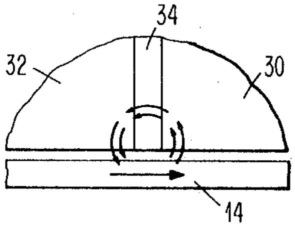
Figure 5C:
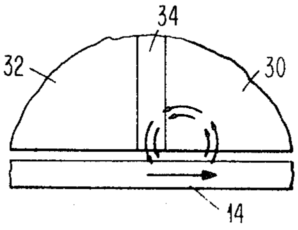
Figure 6:
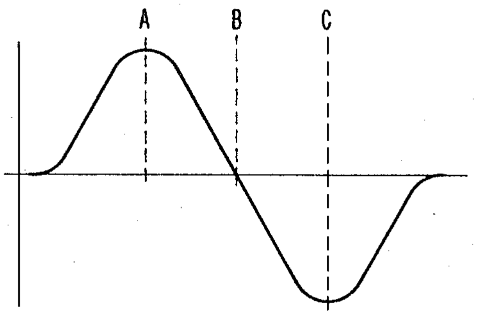
FIG. 6 shows the waveform produced by a photodetector used with the transducer as a function of position of the magnetized area under the transfer film as shown in FIGS. 5A, 5B, and 5C.

In FIGS. 5A, 5B, and 5C, three examples of the magnetic fields in a magnetized piece of tape and the thin film as the tape moves past the transducer are shown. FIG. 6 shows an example of the electrical signal that is produced by the photodetector as the tape moves under the vertical thin film. The horizontal axis in FIG. 6 represents the position of the magnetized area in the tape relative to the vertical thin film. Therefore, the points A, B, and C on the horizontal axis in FIG. 6 indicate the relative strength of signal expected out of a photodetector as the magnetized area moves through positions A, B, and C, as shown in FIGS. 5A, 5B, and 5C, respectively.

In FIG. 5A, the magnetized area, hereinafter called a bit, is just entering under the vertical thin film 34 and the field in the thin film is vertically directed upward. In FIG. 5B, the bit is centered under the vertical thin film 34 and the field through the thin film is essentially horizontal to the left. In FIG. 5C, the bit is exiting from under the thin film 34 and the field is directed vertically down. Of course, a magnetized bit in the opposite direction would cause the field vectors as depicted in FIGS. 5A, 5B, and 5C to be reversed in direction. However, the significant fact is that as the bit moves under the vertical thin film, a first vertical field appears in the film followed by a horizontal field followed by an opposite vertical field.

It is during the vertical magnetization of the thin film that the maximum Kerr Effect or Faraday Effect takes place, and thus it is at these times that the photodetector will have a maximum output. This explains the shape of the waveform in FIG. 6, in that, at points A and C the magnetization of the vertical thin film is in a vertical direction, while at point B, the magnetization of the vertical thin film attempts to be horizontal and there is little Kerr or Faraday Effect on the light. Thus, the electrical signal produced by the photodetector, as shown in FIG. 6, is essentially the same as a signal produced by a conventional wire-wound magnetic head, except that some residual magnetization will remain in the film 34 after the last magnetized area has been moved away from the transducer.

Figure 1:
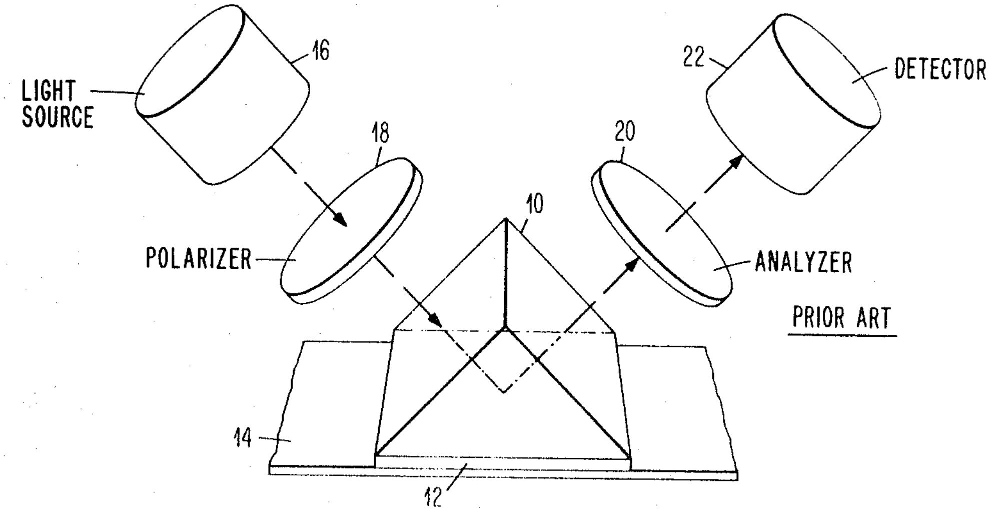
FIG. 1, as previously pointed out, is an example of the prior art magneto-optic transducers.
Figure 2A:
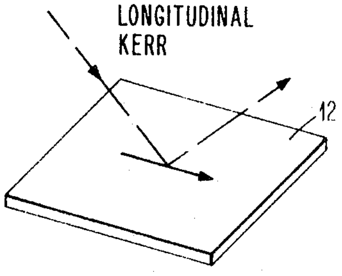
FIG. 2, A and B, show the longitudinal Kerr Effect and the transverse Kerr Effect.
Figure 2B:
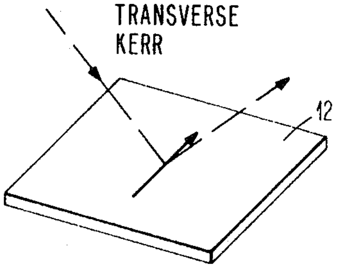

The great advantage of our invention over the prior art can now be clearly seen, in that the effective gap of our head (thickness of the thin film) is 200–500 Angstrom units, or about 1 microinch, while the smallest gap so far realizable in both conventional wire-wound heads and parallel film magneto-optic transducers (FIG. 1) is in the order of 100 microinches. Thus, the resolution over the prior art has improved by about two orders of magnitude.

Some of the alternative preferred embodiments of the invention are shown in FIGS. 7 through 12. However, it will be appreciated by one skilled in the art that any number of optical configurations using different shaped transparent members with the magneto-optic thin film may be used.

Figure 7:
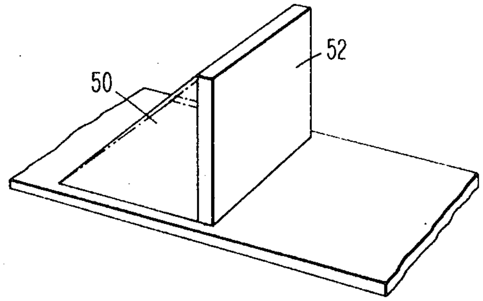
FIG. 7 shows an alternative embodiment for the invention wherein only the Kerr Magneto-optic Effect is used.

In FIG. 7, a transducer is shown which utilizes only the magneto-optic Kerr Effect. In this case, only one prism 50 is required. The vertical thin film is attached to the vertical leg of the right-angle prism. Light enters the hypotenuse face of the right-angle prism 50, reflects off of the thin film 52 and then reflects off the bottom of the prism and exits again out of the hypotenuse face of the prism 50. The operation of the embodiment in FIG. 7 is just as that previously described for the reflected light 42 in FIG. 4.

Figure 8:
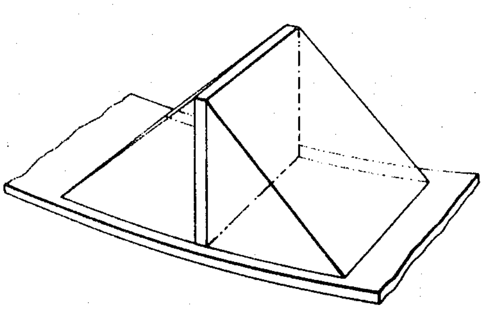
FIG. 8 shows an alternative embodiment of the invention where the bottom face of the transducer is curved.

In FIG. 8, an alternative embodiment is shown wherein the transparent members 40 bonded to the vertical thin film have a cylindrically curved bottom surface. The curved surface helps to reduce flying height between magnetic tape and transducer. This configuration can operate just as that in FIG. 3.

Figure 9:
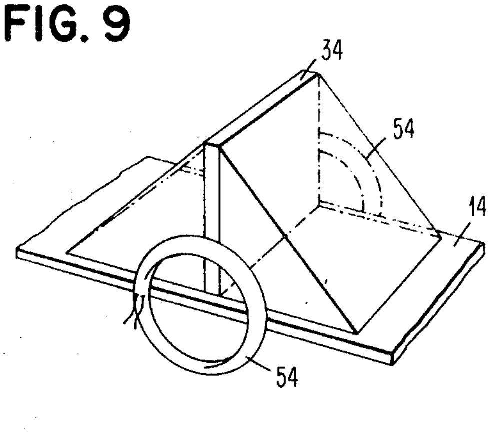
FIG. 9 shows the double prismatic embodiment of the invention with the addition of magnetic coils to provide a bias field to aid the transfer of magnetization from the moving magnetic storage medium to the vertical thin film.

In FIG. 9, the transducer of FIG. 3 is shown, and, in addition, a coil 54 is provided. A matching coil 54 is on the opposite side of the transducer. The purposes of these two coils is to provide a horizontal magnetic field through the vertical thin film along the length of the film. If the thin film is made of a magnetic material exhibiting uniaxial anisotropy having an easy axis and a hard axis of magnetization, the bias field produced by the coils 54 aids the transfer of magnetization from the tape 14 to the thin film 34. Characteristics of the uniaxial anisotropy magnetic materials are well known in the art and are described in commonly assigned U.S. Pat. No. 3,257,648. Briefly, the uniaxial anisotropy material in thin film 34 of FIG. 9 should have its easy axis of magnetization oriented either in the vertical direction or in the horizontal direction along the length of the thin film. The bias field may then be used to aid the transfer of magnetization from the tape 14 to the film 34.

Figure 10:
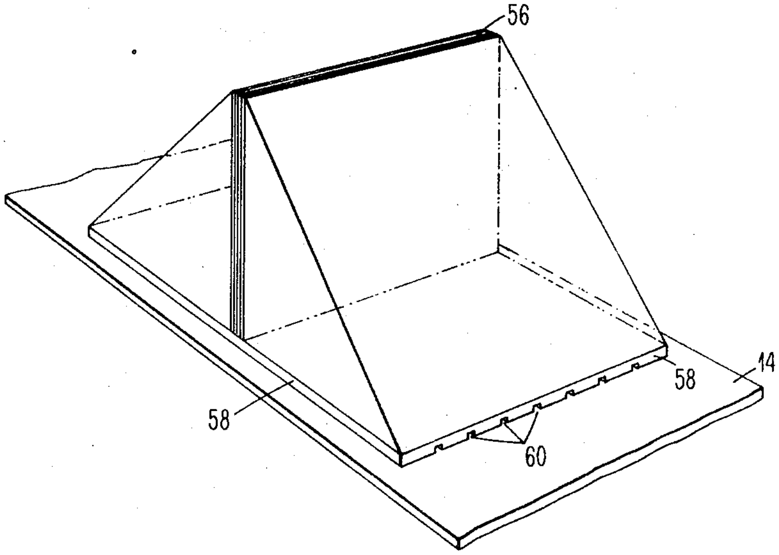
FIG. 10 shows another preferred embodiment of the invention wherein the vertical thin film is multilayered and the bottom face of the transducer has a reflective film which has been slotted.

In FIG. 10, an alternative preferred embodiment of the invention is shown wherein the magneto-optic transfer film is a multilayer film 56 composed of alternate layers of ferromagnetic material and dielectric material.

The transducer in FIG. 10 also has a reflective coating 58 on the bottom of the prism, such as aluminum or silver. This coating will improve the reflectivity of the light reflecting off the bottom of the prism internally and will also serve to protect the prisms from abrasion by the storage medium. In addition, the tape 14 can be brought into extremely close contact in the order of 8 to 10 microinches or less and there will be no frustration of the total internal reflection of the light at the bottom of each prism.

The protective coat 58 can also be grooved by slots 60. The slots 60 permit air squeezed between the tape 14 and bottom face of the transducers to escape. Thus, the tape 14 can be brought into very close contact with the bottom of the transducer. It will be appreciated by one skilled in the art that the features in FIG. 10 can be incorporated into any of the other embodiments shown herein.

Figure 11:
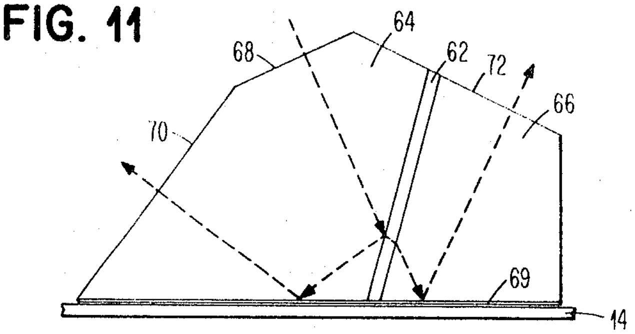
FIG. 11 shows another preferred embodiment wherein the transfer film is oriented at an angle other than 90° relative to the storage medium.

In FIG. 11, an alternative preferred embodiment is shown wherein the transfer film is oriented at an angle other than 90° to the storage medium. The transducer consists of the transfer film 62, a first transparent member 64, and a second transparent member 66. Transparent member 64 is faceted so that incident of light will enter normal to the incident surface 68 of the member and strike the thin film 62 at an angle of incidence somewhere between 30° to 60°. Of course, other angles can be used, but the optimum performance will occur in this range.

The transparent member 64 is also faceted so that the ultimate reflected light off of the bottom of member 64 will pass out of a face 70 which is normal to the path of the light beam. Reflective layer 69 is provided on the bottom of the transducer to insure total internal reflection at that face.

Light that is transmitted through the thin film 62 reflects off the bottom of member 56 and out face 72 of member 66. Face 72 is, of course, positioned so that it is normal to the light beam passing out of member 66. In each case, the exit and entrance face of the transparent members 64 and 66 need not be normal to the light beams; however, optimum transmission of light into and out of the transparent members is achieved when the faces are normal to the light path.

Figure 12:
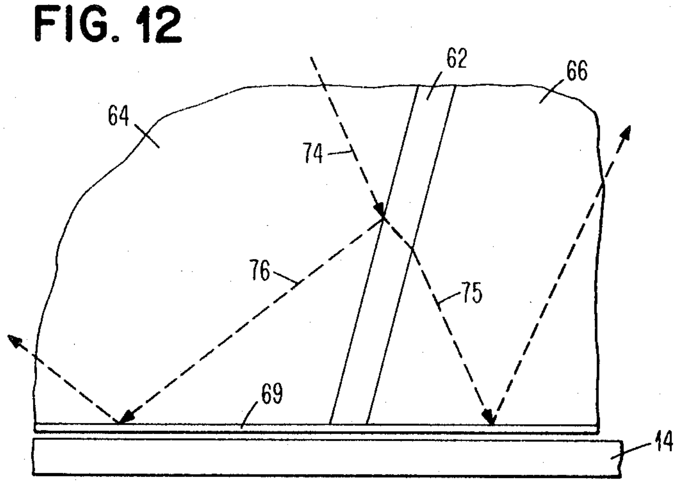
FIG. 12 shows the path of incident and reflected light through the transducer of FIG. 11.

A detail enlargement of the light path in the transducer of FIG. 11 is shown in FIG. 12. The section of the transducer shown in FIG. 12 is near the edge of the transfer film 62 adjacent the tape 14. As previously pointed out for high-bit densities, the height of magnetization in the film 62 will be approximately the length of the magnetized area in the tape 14. Thus, if the magnetized area is about 50 microinches long, the height of magnetization transferred to film 62 will be approximately 50 microinches. This means that the incident light beam 74 must strike the transfer film 62 within 50 microinches of the bottom of the transducer. A portion of the light beam 74 is then refracted through the transfer film 62 and interacts magneto-optically with the magnetization in accordance with the Faraday Effect. The remaining portion of the light beam 74 is reflected to the bottom of transparent member 64. This reflected light beam 76 will carry the information in accordance with the Kerr magneto-optic effect. Reflected beam 76 after it is reflected off of the reflective layer 69 will pass out of the member 64 to be detected as previously discussed. The refracted light beam 75 carrying information in accordance with Faraday Effect will be reflected off reflective layer 69 and exit out member 66 to be detected as previously discussed. Reflective layer 69 is not always necessary, but is provided to insure total internal reflection.

In all of the above figures, the representations have been schematic to aid the understanding of the invention. It will be appreciated by one skilled in the art that the dimensions being dealt with are extremely small and can only be schematically illustrated. While the invention has been particularly shown and described with reference to preferred embodiments thereof, it will be understood by those skilled in the art that the foregoing and other changes in form and details may be made therein without departing from the spirit and scope of the invention. Some variations might include choice of materials for the transparent members and choice of materials for the vertical magnetic thin film, thickness of magnetic thin film, and the type of magnetization and the type of magneto-optic effect to be used, and position and orientation of the transducer relative to the moving magnetic storage medium.

What is claimed is:

1. A magneto-optic transducer for converting variations in magnetization in a magnetic storage medium into variations in a light beam comprising:

a first light transparent member mounted with a first face adjacent to and a second face non-parallel to the surface of the magnetic storage medium;

a second light transparent member mounted with a first face adjacent to and a second face non-parallel to the surface of the magnetic storage medium;

a thin magneto-optic transfer film mounted between said second faces of said transparent members whereby said film is non-parallel to the surface of the magnetic storage medium;

said film having one edge adjacent the surface of the storage medium so that said film is magnetized in accordance with the magnetization in the area of the storage medium adjacent the edge of said film;

said light transparent members having an index of refraction such that total internal reflection will occur at the faces of said members adjacent the magnetic storage medium whereby light can enter said first member, magneto-optically interact with magnetization in said film and be reflected back out of either said first or second member.

2. The magneto-optic transducer of claim 1 wherein said light transparent members have faces normal to the light path of the light beam as the light enters and leaves the transducer.

3. The magneto-optic transducer of claim 1 wherein said light transparent members have a curvature on the faces adjacent the magnetic storage medium so that flying height between the medium and the transducer may be reduced.

4. The magneto-optic transducer of claim 1 wherein said light transparent members have slots cut in the faces of said members adjacent the magnetic storage medium so that the flying height between the medium and the transducer may be reduced.

5. The magneto-optic transducer of claim 1 wherein said thin film is multilayered having alternate layers of ferromagnetic material and dielectric material.

6. The magneto-optic transducer of claim 1 and in addition a reflective film attached to the faces of the light transparent members adjacent the magnetic storage medium whereby total internal reflection will still occur irrespective of close contact between the storage medium and the faces of said members or irrespective of the angle of incidence of the light beam on the faces of said members adjacent the storage medium.

7. The magneto-optic transducer of claim 1 and in addition a source of bias magnetic field to aid the transfer of magnetization from the storage medium to the transfer film.

8. A magneto-optic transducing element for converting variations in magnetization into variations in a light beam comprising:

a magneto-optic transfer film mounted 90° ± 15° to the surface of the magnetic source medium being read out, said film being approximately 200 to 500 Angstrom units thick;

a light transparent member bonded to one side of said film and having a first face normal to a light path which has an angle of incidence to the thin film of 42° ± 5°, said light transparent member also having a second face normal to the path of the light reflected first from the thin film and subsequently from the bottom of the light transparent member.

9. The magneto-optic transducing element of claim 8 and in addition a second light transparent member bonded to the other side of said thin film for internally reflecting light passed through the thin film, said second member having a face normal to the path of the light passed by said film and reflected from the bottom of said second light transparent member.

* * * * *